United States Patent [19]

Shindou et al.

[11] Patent Number: 4,948,678

[45] Date of Patent: Aug. 14, 1990

[54] ORGANIC COMPOSITE PLATED STEEL SHEET HIGHLY SUSCEPTIBLE TO CATIONIC ELECTRODEPOSITION

[75] Inventors: Yoshio Shindou; Takashi Shimazu, both of Kimitsu, Japan

[73] Assignee: Nippon Steel Corporation, Japan

[21] Appl. No.: 468,296

[22] Filed: Jan. 22, 1990

[30] Foreign Application Priority Data

Jan. 23, 1989 [JP] Japan .................. 1-013342

[51] Int. Cl.$^5$ .............................. B32B 15/08
[52] U.S. Cl. .................... 428/623; 428/626; 428/632; 428/653; 428/659
[58] Field of Search ............. 428/623, 626, 632, 653, 428/659, 935

[56] References Cited

U.S. PATENT DOCUMENTS

| | | | |
|---|---|---|---|
| 4,407,899 | 10/1983 | Hara et al. | 428/626 |
| 4,695,516 | 9/1987 | Masuhara et al. | 428/623 |
| 4,702,968 | 10/1987 | Masuhara et al. | 428/632 |
| 4,707,415 | 11/1987 | Ikeda et al. | 428/659 |
| 4,775,600 | 10/1988 | Adiniya et al. | 428/659 |
| 4,853,295 | 8/1989 | Shindo et al. | 428/659 |
| 4,853,297 | 8/1989 | Takahashi | 428/632 |
| 4,876,160 | 10/1989 | Shindou | 428/623 |
| 4,889,775 | 12/1989 | Adamiya et al. | 428/626 |
| 4,891,273 | 1/1990 | Odashima et al. | 428/632 |

FOREIGN PATENT DOCUMENTS

| | | | |
|---|---|---|---|
| 55-51032 | 12/1980 | Japan . | |
| 59-162278 | 9/1984 | Japan . | |
| 59-166678 | 9/1984 | Japan | 428/659 |
| 60-50181 | 3/1985 | Japan . | |
| 60-86283 | 5/1985 | Japan | 428/659 |
| 60-149786 | 8/1985 | Japan . | |
| 61-584 | 1/1986 | Japan . | |
| 61-23766 | 2/1986 | Japan | 428/659 |
| 61-67794 | 4/1986 | Japan | 428/659 |
| 61-152444 | 7/1986 | Japan | 428/659 |
| 62-20024 | 5/1987 | Japan . | |
| 64-8034 | 1/1989 | Japan | 428/659 |

Primary Examiner—John J. Zimmerman
Attorney, Agent, or Firm—Pollock, Vande Sande & Priddy

[57] ABSTRACT

The present invention provides an organic composite plated steel sheet highly susceptible to cationic electrodeposition comprising a steel substrate plated with one selected from the group consisting of zinc, a zinc alloy, a zinc composite alloy, or aluminum, and a first layer of a less soluble chromate film having a water soluble content of 5% or less formed on the substrate in an amount of 10 to 150 mg as the total amount of chromium per square meter, and a second layer as a solid thin coating film of 0.1 to 2 μm formed on the first layer, the second layer being formed with a coating composition containing 10 to 50% by weight of solids comprising:

(a) 30% by weight or more of a bisphenol A type epoxy resin having a number average molecular weight of 300 to 100,000 based on the total solids in the coating composition;

(b) a weight ratio of at least one curing agent selected from the group consisting of polyisocyanate compounds and block polyisocyanate compounds to the epoxy resin solid of 0.1 to 2.0;

(c) 5 to 50% by weight of fumed silica having an average particle size of 0.1 to 100 nm based on the total solids in said coating composition;

(d) at least one pigment selected from the group consisting of insoluble azo type, azo lake type, and phthalocyanine type organic pigments having an average size of 0.01 to 2 μm in an amount of 0.1 to 15% by weight based on the total solids in the coating composition and in a weight ratio of the pigment to the fumed silica of 0.01 to 1.0; and (e) 40% or more of a ketone type organic solvent in the coating composition.

5 Claims, No Drawings

ORGANIC COMPOSITE PLATED STEEL SHEET HIGHLY SUSCEPTIBLE TO CATIONIC ELECTRODEPOSITION

BACKGROUND OF THE INVENTION

1. Field of the Invention

The present invention relates to a thin organic composite film-coated steel sheet which has an excellent press-processability, a high spot-weldability and a high resistance to corrosion, and which is improved in susceptibility to cationic electrodeposition with particularly less formation of pinholes due to gas-evolution and an increase of throwing power, even in a bath after used for a longer period of time, thereby allowing the sheet to be used for the coated steel sheet as a material for use in production of automobiles, domestic electronic articles, buildings, containers, and the like.

2. Description of Related Art

Recently, there has been an increasing need for a less expensive zinc or zinc alloy-plated steel sheet having a higher rustproofing property for use in automobiles, domestic electronic articles, buildings, containers and the like. For this reason, intensive researches have been made to develop new plated steel products.

For example, Japanese Patent KOKAI (Laid-Open) No. Sho 61-23766 and Japanese Patent KOKOKU (Post-Exam. Publn.) No. Sho 62-20024 disclose a weldable steel sheet coated with a thin film of an electrically conductive paint containing metal particles, typically Zincrometal. However, these plated steels suffer practically from occurrence of galling with a die, and unacceptable appearance due to scratches caused by the friction between peeled coating films and a metal die during press-processing. Japanese Patent KOKOKU (Post-Exam. Publn.) No. Sho 55-51032, Japanese Patent KOKAI (Laid-Open) No. Sho 59-162278 and Japanese Patent KOKAI (Laid-Open) No. Sho 61-584 disclose that a high rustproofing property is achieved by coating the surface of the zinc or zinc alloy plated steel sheet with an aqueous dispersion containing chromic acid or chromium compounds. However, these also suffer practically from sweating and elution of chromium into aqueous treating solutions though they have a high rustproofing property. Japanese Patent KOKAI (Laid-Open) No. Sho 60-50181, and Japanese Patent KOKAI (Laid-Open) No. Sho 60-149786 disclose metal plates deposited with a thin coating film from a blend of an emulsion of a water-dispersible resin and an organic silicate complex (silica sol, silane coupling agent). These do not have any problem on the aforementioned chromium elution, but still suffer from a lower water resistance among physical properties of the coating due to the existence of alkali, ammonium ions and the like which are required for maintaining the silica in a colloidal form. In the paint containing fine silica in a solvent, its viscosity becomes too high to effect uniform coating owing to structural variation. Though it may be considered to disrupt the viscous structure by hydrogen bonding with alcohols, it cannot be applied to a system containing polyisocyanate compounds as curing agents. Moreover, there have been requirements for ① a higher resistance to corrosion, ② an enhancement of the bonding between a steel sheet and a coating film formed thereon (especially, a cationic electrodeposited film), and ③ a lower baking temperature (140 to 170° C.) in increasing the strength of processed steel sheet. As a process satisfying the need and solving the aforementioned problems, the present inventors have proposed an organic composite plated steel sheet which exhibits no elution of deleterious materials such as chromium and the like during surface treating by users, and which has a higher resistance to corrosion, a higher processability, and a higher susceptibility to electrodeposition due to a thin coating film baked at lower temperatures, as disclosed in Japanese patent Application No. Sho 62-168393. However, the process for producing such organic composite plated steel sheets has disadvantages that no inclusion of conductive materials such as metal particles in the coating films causes a reduction of the electric current through thicker film portions, and particularly a reduction of the depositing ability of the cationic electrodepositing bath after used for a longer period of time as occurring actually in the bath employed by automobile makers. To cope with the difficulties, a temporary expedient has been employed to provide micropores in the coating films rendering them more electrically conductive, or to provide a minimum deposition as a film thickness of 0.1 μm.

SUMMARY OF THE INVENTION

The present invention is to provide an organic composite plated steel sheet which is excellent in press-processability, spot-weldability and resistance to corrosion, and which is improved in susceptibility to the cationic electrodeposition, particularly with less formation of pinholes due to gas-evolution and an increase of throwing power. The present invention achieves an improvement of the susceptibility to the electrodeposition in the cationic electrodepositing bath even after it has been used for a longer period of time, while maintaining the performance of the organic composite plated steel sheets as disclosed in Japanese Patent Application No. Sho 62-168393.

According to the present invention, there is provided a coated steel sheet comprising a steel substrate having zinc, a zinc alloy, a zinc composite alloy, or aluminum plated thereon, and a first layer formed on the substrate in an amount of 10 to 150 mg/m$^2$ as a total chromium amount, the first layer being a less soluble chromate coating film having a water soluble component of 5% or less, and a second layer as a solid thin coating film of 0.2 to 2 μm formed on the first layer, the second layer being formed with a coating composition containing 10 to 50% by weight of solids comprising:

(a) 30% by weight or more of a bisphenol A type epoxy resin having a number average molecular weight of 300 to 100,000 based on the total solids in the coating composition;

(b) a weight ratio of at least one curing agent selected from the group consisting of polyisocyanate compounds and block polyisocyanate compounds to said epoxy resin of 0.1 to 2.0;

(c) 5 to 50% by weight of fumed silica having an average size of 0.1 to 100 nm based on the total solids in the coating composition;

(d) at least one pigment selected from the group consisting of insoluble azo, azo lake, and phthalocyanine organic pigments having an average size of 0.01 to 2 μm in an amount of 0.1 to 15% by weight based on the total solids in the coating composition and in a weight ratio of the pigment to the fumed silica of 0.01 to 1.0; and (e) 40% or more of a ketone type organic solvent in the coating composition.

The ketone type organic solvent (e) in the coating composition is at least one member selected from the group consisting of methylisobutyl ketone, acetone, cyclohexanone, and isophorone.

In an embodiment, the coating composition may contain a resol type phenol resin in an amount of a weight ratio of 0.1 to 1.0 to the solids of the curing agent (b).

In another embodiment, the coating composition may contain 0.1 to 10% by weight of polyethylene wax based on the total solids in the coating composition.

The term "insoluble" as used here means that the pigments do not dissolve from the coating films into liquors used subsequently for degreasing, phosphating and/or cationic electrodeposition.

DESCRIPTION OF PREFERRED EMBODIMENTS

The present invention provides a steel sheet coated with a specific chromate film characterized in that the steel sheet is deposited with a thin coating film of a composition in an organic solvent system comprising a bisphenol A type epoxy resin, a polyisocyanate compound, fumed silica and a ketone type organic solvent, as disclosed in Japanese Patent Application No. Sho 62-168393. This organic composite plated steel sheet is excellent in resistance to corrosion, spot-weldability, coating properties and press-processability. An extensive research has been made to develope an improved organic composite plated steel sheet containing modifying agents which allow the plated steel sheet to be highly susceptible to a cationic electrodeposition while preserving the above excellent properties of the prior organic composite plated steel sheet. As a result, it has been discovered that the pigments such as insoluble azo, azo lake, and phthalocyanine organic pigments which have been heretofore employed as coloring pigments function as agents advantageously modifying the electrodeposition in a cationic electrodepositing bath even after the bath has been used for a longer period of time. The present invention is based on the discovery.

Steel sheets plated with zinc, a zinc alloy, a zinc composite alloy, or aluminum to be used in the present invention include electroplated steel sheets such as those plated with zinc, a zinc/nickel alloy, or a zinc/iron alloy, and those plated with a zinc composite alloy consisting of a zinc/nickel or zinc/iron substrate having a metal oxide dispersion-plated thereon which may be $SiO_2$, $TiO_2$, $Al_2O_3$, $ZrO_2$, $BaCrO_4$, or the like; hot dipped steel sheets such as those deposited with zinc, a zinc alloy, a zinc/aluminum alloy, or aluminum. Any one of the above coated steel sheets which can be obtained by known methods may be employed.

The functions of each structural component contained in the composite sheets according to the present invention will be explained below.

① Less soluble chromate coating film (First layer)

The chromate coating film used in the present invention exists between the primer plating layer and the second coating film to enhance the adhesion of the coating film to the layer, rendering the organic composite plated steel sheets more resistant to corrosion, which sheets are highly susceptible to the cationic electrodeposition. It is necessary, however, to make the chromate coating film less soluble for preventing its components from eluting into water with a swelling of the film.

If the water soluble components in the chromate coating film is higher than 5%, the elution of chromium due to the swelling of the film is larger making it difficult to enhance the adhesion of the second coating film, appearance of the electrodeposition coating and the like (reduction of the formation of pinholes due to gas evolution). Moreover, there is a problem that chemically treating liquors are contaminated with the eluted chromium.

If the amount of the less solubilized chromate coating film to be deposited is lower than 10 $mg/m^2$ as chromium, unpreferably the adhesion of the second coating film becomes poor and the resistance to corrosion is difficult to increase. On the other hand, if the total amount of chromium is higher than 150 $mg/m^2$, unpreferably the adhesion of the second coating film is reduced owing to disruption of the cohesion of the chromate film upon press-processing and the like, and the applicability of sequential dotting at spot-welding is adversely affected.

As can be seen from the above discussion, the amount of less soluble chromate coating film to be deposited should be in the range of 10 to 150 $mg/m^2$ as the total chromium.

② Coating film in an organic solvent system (Second coating film)

As the epoxy type binder resin (a) used in the coating composition of the present invention, a bisphenol A type epoxy resin having a number average molecular weight of 300 to 100,000 which is soluble in an organic solvent and good in resistance to water, alkali-proofing property, particularly excellent in the adhesion to the underlying layer and overcoating film. For example, resins having the following formula:

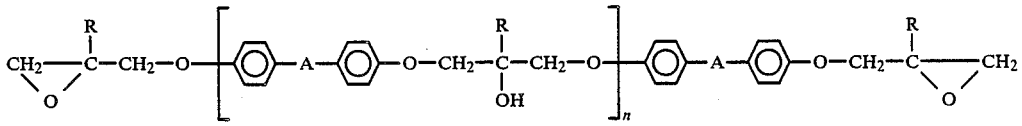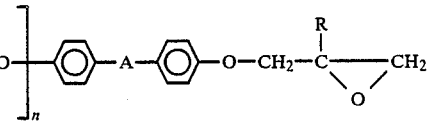

where R represents H or $CH_3$; -A- represents $>C(CH_3)_2$, $-CH_2-$, $-O-$, $O=S=O$, or $-S-$, may be used.

When -A- is $>C(CH_3)_2$, most preferable results can be obtained. If the number average molecular weight is less than 300, the coating film is not sufficiently polymerized by the reaction resulting in a deficiency in the resistance to corrosion. On the other hand, if it is over 100,000, again a sufficient crosslinking reaction can not be achieved resulting in a deficiency in the resistance to corrosion.

The aforementioned bisphenol A type epoxy resin (a) should be incorporated in an amount of 30% by weight based on the total solids in the coating composition. Less than 30% of the resin reduces the ability of the resin to bond dry silica particles making it difficult to produce a uniform coating dispersion and rendering the formation of film insufficient.

The curing agent (b) comprises polyisocyanate compounds and/or block polyisocyanate compounds.

The polyisocyanate compounds include, for example, aliphatic or alicyclic diisocyanate compounds (hexamethylene diisocyanate, isophorone diisocyanate, hydrogenated diphenylmethane diisocyanate and the like), aromatic diisocyanate compounds (tolylene diisocyanate, diphenylmethane-4,4'-diisocyanate and the like), and triisocyanate compounds (an adduct of 1 mol of trimethylolpropane and 3 mol of diisocyanate, trimer of hexamethylene diisocyanate or tolylenediisocyanate and the like). One or two or more may be employed.

The block polyisocyanate compounds include, for example, those which the aforementioned isocyanates are blocked with a blocking agent, wherein the blocking agent must be capable of bonding to isocyanate groups to produce a blocked compound which is stable at room temperature, but dissociates to reproduce free isocyanate radicals.

Such blocking agents include, for example, lactam type blocking agents ($\epsilon$-caprolactam, $\gamma$-butyrolactam, and the like), oxime type blocking agents (methyl ethyl ketoxime, cyclohexanone oxime and the like), alcohol type blocking agents (methanol, ethanol, isobutyl alcohol, and the like), phenol type blocking agents (phenol, p-tert.-butyl-phenol, cresol, and the like), ester type blocking agents (ethyl acetoacetate, methyl acetoacetate, and the like). Methyl ethyl ketoxime, ethyl acetoacetate, and the like which are able to dissociate at a lower temperature and stable in storage of the coating composition are most preferred.

An amount of the curing agent (b) to be incorporated is in a weight ratio of 0.1 to 2.0 of the agent to the aforementioned epoxy resin (a) solids which can provide a suitable vehicle through a reaction between (a) and (b) at a lower temperature for a short time. For example, the reaction may sufficiently take place under such baking conditions as the maximum temperature attainable by the sheet being 160° C. or less and the baking time being only for 5 to 60 seconds. If the mixing ratio of (b)/(a) is less than 0.1, an insufficient cross linking reaction is effected resulting in an insufficient resistance to corrosion. To the contrary, if it is higher than 2.0, the resistance to water and alkali-proofing property of the resulting coating film is reduced, and the adhesion of the overcoating becomes deficient.

If necessary, a resol type phenol resin may be added to the curing agents which combination may be employed and effective to promote the film forming reaction during baking at a lower temperature (the maximum temperature which the sheet may reach is about 100° to 130° C.). The most preferable resol type phenols are those having the following general formula:

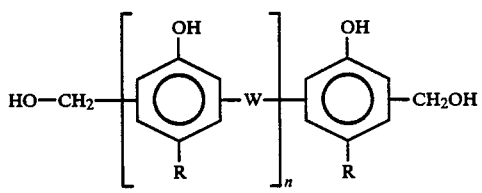

where n is 0 to 4; W represents -CH$_2$-, or -CH$_2$-O-CH$_2$-; R represents CH$_2$-, H or -C(CH)-$\phi$-OH.

An amount of these resol type phenol resins to be added is preferably in a weight ratio of the resins to the solids of the curing agent (b) of 0.1 to 1.0. The ratio of higher than 1.0 leads to a reduction of the alkali-proofing property, and that the amount of lower than 0.1 has no effect of promoting the reaction.

According to the present invention, fumed silica having an average size of 0.1 to 100 nm is incorporated into the coating composition in the range of 5 to 50% by weight based on the total solids therein in order to impart a higher resistance to corrosion to the coating without eluting any deleterious substances into a degreasing bath or a phosphating bath. The primary particles of the fumed silica having an average size of less than 0.1 nm lead to a reduction of the adhesion of the overcoating film and those of higher than 100 nm result in reductions of the resistance to corrosion and the smoothness of the electrodeposited coating film. Therefore, the average size of the silica particles should be in the range of 0.1 to 100 nm. An amount of the fumed silica (c) to be incorporated should be preferably in the range of 5 to 50% by weight. The incorporation of such a large amount of fumed silica could be realized by using the ketone type organic solvent (e). If the fumed silica is less than 5% by weight, the resistance to corrosion becomes insufficient, while if it is higher than 50% by weight, the adhesion of the coating film at processing and the spot-weldability are lowered, and the resulting composition has so high viscosity that uniform coating film can not be easily obtained. Thus, the incorporation of the fumed silica in an amount outside the range is unsuitable for the purpose of the present invention.

According to the present invention, the insoluble azo, azo lake, and phthalocyanine organic pigments (d) having an average size of 0.01 to 2 $\mu$m are used in an amount of 0.1 to 15% by weight based on the total solids in the coating composition to enhance the electrodeposition in a cationic electrodepositing bath even after used for a longer period of time. The electrodepositing bath after used for a longer period of time tends to be unsuitable in a heated residue content, ash content, electric conductivity, and pH value, and to cause problems such as the formation of pinholes due to gas evolution and an reduction of the throwing power which result from the contamination of the bath. The actual electrodeposition lines conducted by automobile manufactures include the use of a large electrodepositing bath containing coating materials, in which bodies of cars are continuously coated. Since this continuous process is performed by replenishing the bath to compensate for consumed coating materials, the bath being actually used contains substances which have been produced during deposition for a long time. However, current widely spread substrates, i.e., cold-rolled steel sheets, zinc or zinc alloy-plated steel sheets, and metal particles-containing organic composite plated steel sheets have a good electrical conductivity. For these substrates, electrodepositing compositions have been developed, and hence some differences in electrodeposition conditions do not give any problem. In the case of metal free thin film organic composite plated steel sheets, however, they have an inferior electrical conductivity, and no electrodepositing composition for them have not been developed. They are susceptible to the influence of film thickness which affects directly the electrical conductivity. The aforementioned pigments used in the present invention have an effect on ensuring electroconductive sites which contribute uniformity and electrical conductivity of the surface of the coating film in the electrodepositing composition, so that the bath containing the electrodepositing composition exhibits good electrodeposition properties even after used for a longer period of time. The primary grain size of the pigment particles should be as small as possible for thin film coating. However, if it is lower than 0.01, an effect on improving cationic electrodeposition is reduced. If it is higher than 2 μm, insufficient coating of the cationic electrodeposition improving pigments with the binder is obtained to result possibly in poor press-processability and lower resistance to corrosion. Therefore, the pigments should have a particle size of 2 μm or less. Thus, the pigments should have an average grain size in the range of 0.01 to 2 μm. An amount of the cationic electrodeposition improving pigment (d) to be incorporated should be preferably in the range of 0.1 to 15% by weight based on the total solids in the coating composition. If the cationic electrodeposition improving pigment (d) is less than 0.1% by weight, the electrodeposition improving effect becomes insufficient in the cationic electrodepositing bath after used for some time, while if it is higher than 15% by weight, there are caused problems that the adhesion of the coating film during processing and the spot-weldability are reduced. In order to balance the total amount of the pigments in the coating composition, the cationic electrodeposition improving pigment (d) should be in a ratio of the pigments to the fumed silica of 0.01 to 1.0. The ratio of less than 0.01 can not achieve a sufficient cationic electrodeposition improving effect, while the ratio of higher than 1.0 inhibits the effect of the fumed silica on the resistance to corrosion. As the pigment (d) useful in the present invention, for example, one may employ insoluble azo type pigments having the following general formula:

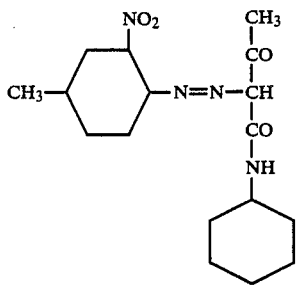

as well as phthalocyanine type organic pigments, and azo lake type organic pigments. Though dye lake type pigments have an effect on improving the electrodeposition in the cationic electrodepositing bath after used for some time, they cause an inferior resistance to corrosion and poor alkali-proofing property, and hence elution of the pigments into degreasing and phosphating bath subsequently to raise practical problems of requiring troublesome works in treatment of the contaminated liquors to be discharged.

In the present invention, the coating composition may be obtained by dissolving or dispersing the aforementioned components in an organic solvent. As organic solvent, the ketone type organic solvent (e) should be incorporated in an amount of 40% or more by weight in the coating composition, and the concentration of solids in the coating composition should be adjusted to 10 to 50% by weight, thereby making it possible to form easily uniform films. If the solid concentration is less than 10% by weight, the excess solvent is uneconomical, while if it is higher than 50% by weight, the uniformity of coating films and the coating workability is unpreferably reduced.

Ketone type organic solvents include most preferably methylisobutyl ketone, acetone, cyclohexanone and isophorone. In combination with any of them, other solvents may be employed, if desired, provided that the use of such solvents reactive with polyisocyanates as, for example, water and alcohols should be avoided.

Relation between the solvents and the aforementioned fumed silica is in detail as follows: the higher the content of the fumed silica in the coating composition for ensuring a higher resistance to corrosion, the higher the viscosity of the coating composition to tend to cause coagulation, which makes it difficult to coat uniformly with the coating composition, particularly makes it almost impossible to form a uniform thin film (on the order of several micrometers). For this reason, solvents having a high affinity for hydrogen, i.e., water or alcohol type solvents have been conventionally employed to decrease the viscosity, which in turn has limited useful soluble resins, and excluded the use of isocyanate compounds, confining the design of coating formulation. Such method, therefore, could not provide coating films having a sufficient quality to achieve the present purposes. According to the present invention, as discussed above, the use of the ketone organic solvents allows the high concentration of silica to be incorporated and the combination of the bisphenol type epoxy resins and the polyisocyanate compounds capable of forming tough coating films to be stably dissolved achieving the objects of the present invention.

For improving the press-processability of the rustproof steel sheets, the coating composition may contain lubricants such as carboxylic acid esters, metal carboxylates, polyalkylene glycols; powdery lubricants such as molybdenum disulfide, silicone compounds, fluorinated compounds and the like. The lubricants may preferably be added in an amount of 0.1 to 10% by weight based of the total solids in the coating composition to further improve the processability. Most preferred lubricants are polyethylene wax having a molecular weight of 1,000 to 10,000 and an acid number of 15 KOH mg/g or less. If an amount of this wax to be added is less than 0.1% by weight, the surface of the coating film has a higher friction resistance to cause galling and peeling of the film during press-processing making the use of the wax impractical. On the other hand, it is in excess of 10% by weight, there is a tendency that uneven contracting pattern of the lubricant is produced in the coating film in a water-cooling zone after the baking stage adversely affecting the appearance of the finished coating film. The use of such an amount should be avoided from a practical point of view. Waxes having an acid number of higher than 15 KOH mg/g is completely dissolved into the coating film so that the lubricating effect is reduced. Therefore, the acid number should be 15 KOH mg/g or less, whereby a wax layer is formed on the surface of the coating film to achieve a high lubricating effect.

In the present invention using the coating composition as described above, a solid film having a thickness of less than 0.2 μm is insufficient in resistance to corrosion, while that of higher than 2 μm is not preferred because of unacceptable spot-weldability and appearance of the electrodeposited film.

As to the organic composite plated steel sheets susceptible to the cationic electrodeposition according to the present invention, various pigments as described below may be added to the coating composition for the top coating film of an organic solvent type in order to further improve its performance as follows. Rustproofing pigments as conventionally added to ordinary paints (chromate pigments, especially less soluble zinc, lead, and barium chromates, phosphate pigments, plumbate pigments), structural pigments (carbonate pigments, silicate pigments), rustproofing agents (amine compounds, phenolic carboxylic acids), dispersion stabilizer, inorganic coloring pigments (Indian red, titanium white) may be added, which should be adjusted to an average particle size of 1 μm or less fully taking account of their spot-weldability and press-processability.

Baking conditions for the coating films deposited with the coating composition of the present invention are not critical. Good performance could be obtained by baking at a final baking temperature in a wide range of 100 to 200° C. for a short time. The coating composition may be deposited by any one of known coating methods including roll-coating, curtain flow-coating.

The organic composite plated steel sheets of the present invention which are highly susceptible to the cationic electrodeposition coating are drastically improved in press-processability, spot-weldability, and resistance to corrosion over the prior organic composite steel sheets having a problem on quality and, moreover, in cationic electrodeposition in the cationic electrodepositing bath even after used for a longer period of time. Therefore, the present organic composite plated steel sheets are epock-making ones which can sufficiently meet the need on market.

The present invention will be described in detail with reference to the following Examples.

Examples

To low carbon steel sheets of 0.8 mm thick were applied a predetermined zinc plating, zinc alloy plating, zinc composite alloy plating, or aluminum plating by known plating methods, and immediately thereafter, applied a predetermined less soluble chromate treatment. Then, a coating composition having a predetermined composition was applied on one side of the plated sheets to a predetermined thickness by roll coating, and immediately thereafter, baked with the sheets reaching the maximum temperature of 150° C. for 20 seconds. The performances of the resulting coated steel sheets are summarized in Table 1, in which proportions of the coating composition to be incorporated are indicated in terms of % by weight.

The effects of the chromate coating films are shown in Examples Nos. 1 to 12 and Comparative Examples Nos. 13 to 15. As can be seen from the results, it is necessary that the chromate coating film between the primer plating layer and the overcoating film must be less soluble in water and the deposition amount is preferably in the claimed range in view of performance and costs.

Effects of factors included in the coating films of the present organic composite plated steel sheets highly susceptible to the cationic electrodeposition are described below. First, suitable molecular weights and proportions of the major resins to be incorporated are indicated in Examples Nos. 3, 16, 17, 20 to 23, and Comparative Examples Nos. 18 and 19. From these, it can be seen that an epoxy resin is preferred as major resin.

As resin-curing agents, hexamethylene diisocyanate type is preferred as can be seen from Examples Nos. 3, and 24 to 26, and Comparative Examples Nos. 27 and 28. In view of pot-life and coating workability of the coating composition, such curing agents as having isocyanate group (-NCO) blocked with ethyl acetoacetate, c-caprolactam, or the like should be employed. Moreover, it can be seen that a ratio of the curing agents to be incorporated to the major resins should be 0.1 to 2.0 by weight to achieve sufficient film strength through baking at lower temperatures.

The high rustproof exhibited by the present organic composite plated steel sheets highly susceptible to the cationic electrodeposition is contributed largely to by the fumed silica contained in the coating films, and proportions and suitable particle sizes thereof are indicated in Examples Nos. 3, and 29 to 35, and Comparative Examples Nos. 36 to 38. From these, fine fumed silica is preferred, and the inclusion thereof in the claimed range can improve the resistance to swelling with water, and achieve the high resistance to corrosion.

In the present invention, in order to enhance the formation of electrodeposited films in the cationic electrodepositing bath even after it has been used for some time, there is added an insoluble azo type, azo lake type, or phthalocyanine type organic pigment which has been used conventionally as coloring pigment. The effects on the formation and the performances of the electrodeposited films are indicated in Examples Nos. 76 to 79, 83 to 85, 87, 88, 90, and Comparative Examples Nos. 80 to 82, 86, 89, and 91. The particle size over 2 μm results in insufficient coating of the cationic electrodeposition improving pigment with a binder accompanied with reduction in press-processability and resistance to corrosion. It can be seen, therefore, that the particle size must be 2 μm or less. An amount of the cationic electrodeposition improving pigment to be incorporated of less than 0.1% by weight results in insufficient improvement of the cationic electrodeposition, while that of higher than 15% by weight does in poor press-processability and other inferior performances. Most preferable cationic electrodeposition improving pigments are azo type, phthalocyanine type, and azo lake type organic pigments. Dye lake type results in poor alkali-proof, though it has an effect on improving the cationic electrodeposition. The use of carbon black in combination with the pigments further enhances the cationic electrodeposition improving effect. If a ratio by weight of the pigments to the fumed silica is over 1.0, the effect of the fumed silica is inhibited.

Then, the lubricants used in the present invention to be added in the coating films, primarily polyethylene wax were tested and the results are shown in Examples Nos. 3, 39 to 44, and Comparative Examples Nos. 45 to 46. Although it is considered that a practically acceptable level of the press-processability has been attained even without incorporating polyethylene wax, the wax should be preferably incorporated in the claimed range in order to maintain the level of processability which does not cause galling with a reduction of the friction resistance of the coating films. An excess incorporation of the wax leaded to a reduction of the resistance to swelling with water and a poor resistance to corrosion.

The results as to suitable organic solvents in the coating composition are shown in Examples Nos. 3 and 47, and Comparative Examples Nos. 48 and 49. Ketone type solvents may be incorporated as organic solvents used in the present invention. However, the use of water and alcohol type solvents should be avoided because of lack of compatibility with the polyisocyanate curing agents and causing reductions in coating workability and quality.

The results as to film thicknesses suitable in the present invention are indicated in Examples Nos. 3, 50 to 56, and Comparative Examples Nos. 57 to 58. As can be seen from the results, it is necessary that the film thickness in the claimed range is required in view of resistance to corrosion, spot-weldability, and electrodepositing property.

The results as to variation of the primer plating system are shown in Examples Nos. 59 to 75. It should be appreciated that the present invention may be applied to various plating systems.

TABLE 1

| | No. | Deposition *1 Deposition system | Deposition amount (g/m²) | Chromate *2 Water soluble component (%) | Chromate *2 Deposition amount T. Cr (mg/m²) | (a) Main resin *3 Type | (a) Main resin *3 Molecular weight |
|---|---|---|---|---|---|---|---|
| Example | 1 | Electric Zn-11% Ni alloy | 20 | 0 | 40 | Epoxy | 2900 |
| " | 2 | Electric Zn-11% Ni alloy | " | 0.3 | " | " | " |
| " | 3 | Electric Zn-11% Ni alloy | " | 0.5 | " | " | " |
| " | 4 | Electric Zn-11% Ni alloy | " | 1 | " | " | " |
| " | 5 | Electric Zn-11% Ni alloy | " | 3 | " | " | " |
| " | 6 | Electric Zn-11% Ni alloy | " | 5 | " | " | " |
| " | 7 | Electric Zn-11% Ni alloy | " | 0.5 | 10 | " | " |
| " | 8 | Electric Zn-11% Ni alloy | " | " | 20 | " | " |
| " | 9 | Electric Zn-11% Ni alloy | " | " | 60 | " | " |
| " | 10 | Electric Zn-11% Ni alloy | " | " | 100 | " | " |
| " | 11 | Electric Zn-11% Ni alloy | " | " | 120 | " | " |
| " | 12 | Electric Zn-11% Ni alloy | | | 150 | | |
| Comparative Example | 13 | Electric Zn-11% Ni alloy | " | 10 | 40 | " | " |
| Comparative Example | 14 | Electric Zn-11% Ni alloy | 0.5 | 5 | " | " | |
| Comparative Example | 15 | Electric Zn-11% Ni alloy | " | " | 200 | " | " |
| Example | 16 | Electric Zn-11% Ni alloy | " | " | 40 | " | 900 |
| " | 17 | Electric Zn-11% Ni alloy | " | " | " | " | 3750 |
| Comparative Example | 18 | Electric Zn-11% Ni alloy | " | " | " | Oil free polyester | 15000 |
| Comparative Example | 19 | Electric Zn-11% Ni alloy | " | " | " | Carboxylated polyethylene | 100000 |
| Example | 20 | Electric Zn-11% Ni alloy | " | " | " | Epoxy | 2900 |
| " | 21 | Electric Zn-11% Ni alloy | " | " | " | " | " |
| " | 22 | Electric Zn-11% Ni alloy | " | " | " | " | " |
| " | 23 | Electric Zn-11% Ni alloy | " | " | " | " | " |
| " | 24 | Electric Zn-11% Ni alloy | " | " | " | " | " |
| Example | 25 | Electric Zn-11% Ni alloy | " | " | " | " | " |
| " | 26 | Electric Zn-11% Ni alloy | " | " | " | " | " |
| Comparative Example | 27 | Electric Zn-11% Ni alloy | " | " | " | " | " |
| Comparative Example | 28 | Electric Zn-11% Ni alloy | " | " | " | " | " |
| Example | 29 | Electric Zn-11% Ni alloy | " | " | " | " | " |
| " | 30 | Electric Zn-11% Ni alloy | " | " | " | " | " |
| " | 31 | Electric Zn-11% Ni alloy | " | " | " | " | " |
| " | 32 | Electric Zn-11% Ni alloy | " | " | " | " | " |

TABLE 1-continued

| | | | | | | | |
|---|---|---|---|---|---|---|---|
| " | 33 | Electric Zn-11% Ni alloy | " | " | " | " | " |
| " | 34 | Electric Zn-11% Ni alloy | " | " | " | " | " |
| " | 35 | Electric Zn-11% Ni alloy | " | " | " | " | " |
| Comparative Example | 36 | Electric Zn-11% Ni alloy | " | " | " | " | " |
| Comparative Example | 37 | Electric Zn-11% Ni alloy | " | "– | " | " | " |
| Comparative Example | 38 | Electric Zn-11% Ni alloy | " | " | " | " | " |
| Example | 39 | Electric Zn-11% Ni alloy | " | " | " | " | " |
| " | 40 | Electric Zn-11% Ni alloy | " | " | " | " | " |
| " | 41 | Electric Zn-11% Ni alloy | " | " | " | " | " |
| " | 42 | Electric Zn-11% Ni alloy | " | " | " | " | " |
| " | 43 | Electric Zn-11% Ni alloy | " | " | " | " | " |
| " | 44 | Electric Zn-11% Ni alloy | " | " | " | " | " |
| Comparative Example | 45 | Electric Zn-11% Ni alloy | " | " | " | " | " |
| Comparative Example | 46 | Electric Zn-11% Ni alloy | " | " | " | " | " |
| Example | 47 | Electric Zn-11% Ni alloy | " | " | " | " | " |
| Comparative Example | 48 | Electric Zn-11% Ni alloy | " | " | " | " | " |
| Comparative Example | 49 | Electric Zn-11% Ni alloy | " | " | " | " | " |
| Example | 50 | Electric Zn-11% Ni alloy | " | " | " | " | " |
| " | 51 | Electric Zn-11% Ni alloy | " | " | " | " | " |
| " | 52 | Electric Zn-11% Ni alloy | " | " | " | " | " |
| " | 53 | Electric Zn-11% Ni alloy | " | " | " | " | " |
| " | 54 | Electric Zn-11% Ni alloy | " | " | " | " | " |
| " | 55 | Electric Zn-11% Ni alloy | " | " | " | " | " |
| " | 56 | Electric Zn-11% Ni alloy | " | " | " | " | " |
| Comparative Example | 57 | Electric Zn-11% Ni alloy | " | " | " | " | " |
| Comparative Example | 58 | Electric Zn-11% Ni alloy | " | " | " | " | " |
| Example | 59 | Electric Zn-15% Fe alloy | " | " | " | " | " |
| " | 60 | Electric Zn-11% Ni alloy | 60 | " | " | " | " |
| " | 61 | Electric Zn-2% Ni-10% Cr | 20 | " | " | " | " |
| " | 63 | Electric Zn-11% Ni-3% SiO$_2$ | 20 | 0.5 | 40 | Epoxy | 2900 |
| " | 64 | Ni-3% Zn-15% Fe-3% SiO$_2$ | 20 | " | " | " | " |
| " | 65 | Ni-3% Zn-11% Ni-3% TiO$_2$ | 20 | " | " | " | " |
| " | 66 | Ni-3% Zn-11% Ni-3% Al$_2$O$_3$ | 20 | " | " | " | " |
| " | 67 | Ni-3% Zn-9% Ni-3% ZrO$_2$ | 20 | " | " | " | " |
| " | 68 | Ni-3% Zn-9% Ni-3% Cr-3% SiO$_2$ | 20 | " | " | " | " |
| " | 69 | Hot-dip Zn-10% Fe alloy | 60 | " | " | " | " |
| " | 70 | Hot-dip Zn-5% Al alloy | 60 | " | " | " | " |

TABLE 1-continued

| | | | | | | | |
|---|---|---|---|---|---|---|---|
| " | 71 | Hot-dip Zn-5% Al-0.1% Mg alloy | 60 | " | " | " | " |
| " | 72 | Electric Zn-85% Fe/Zn-15% Fe alloy | 3/20 | " | " | " | " |
| " | 73 | Hot-dip Zn-5% Al-0.1% Si | 60 | 0.5 | 40 | Epoxy | 2900 |
| " | 74 | Hot-dip aluminum | 60 | " | " | " | " |
| " | 75 | Hot-dip Zn | 60 | " | " | " | " |
| " | 76 | Electric Zn-11% Ni alloy | 20 | " | " | " | " |
| " | 77 | Electric Zn-11% Ni alloy | 20 | " | " | " | " |
| " | 78 | Electric Zn-11% Ni alloy | " | " | " | " | " |
| " | 79 | Electric Zn-11% Ni alloy | " | " | " | " | " |
| Comparative Example | 80 | Electric Zn-11% Ni alloy | " | " | " | " | " |
| Comparative Example | 81 | Electric Zn-11% Ni alloy | " | " | " | " | " |
| Comparative Example | 82 | Electric Zn-11% Ni alloy | " | " | " | " | " |
| Example | 83 | Electric Zn-11% Ni alloy | " | " | " | " | " |
| " | 84 | Electric Zn-11% Ni alloy | " | " | " | " | " |
| " | 85 | Electric Zn-11% Ni alloy | " | " | " | " | " |
| Comparative Example | 86 | Electric Zn-11% Ni alloy | " | " | " | " | " |
| Example | 87 | Electric Zn-11% Ni alloy | " | " | " | " | " |
| " | 88 | Electric Zn-11% Ni alloy | " | " | " | " | " |
| Comparative Example | 89 | Electric Zn-11% Ni alloy | " | " | " | " | " |
| Example | 90 | Electric Zn-11% Ni alloy | " | " | " | " | " |
| Comparative Example | 91 | Electric Zn-11% Ni alloy | " | " | " | " | " |

| Organic solvent type coating film | | | | |
|---|---|---|---|---|
| | (b) Curing agent *4 | | Fumed silica *5 | |
| Incorporation proportion (%) | Type | Incorporation ratio | Average particle size (mµ) | Incorporation proportion (%) |
| 47.3 | HMDI-AEA | 0.5 | Aerosil 300 (8) | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 73.0 | — | 0 | Snowtex N (15) | 25 |
| 64.5 | HMDI-AEA | 0.1 | Aerosil 300 (8) | 25 |
| 54.6 | " | 0.3 | " | 25 |
| 35.5 | " | 1 | " | 25 |
| 32.3 | " | 1.2 | " | 25 |
| 47.3 | HMDI | 0.5 | " | 25 |
| 47.3 | HMDI-CLN | 0.5 | " | 25 |
| 47.3 | HMDI-AEA3, BKS316 2 | 0.5 | " | 25 |
| 59.2 | Super- | 0.2 | " | 25 |

TABLE 1-continued

| | | | | |
|---|---|---|---|---|
| 59.2 | beckamine BKS-316 | 0.2 | " | 25 |
| 60.7 | HMDI-AEA | 0.5 | " | 5 |
| 57.3 | " | 0.5 | " | 10 |
| 54.0 | " | 0.5 | " | 15 |
| 40.7 | " | 0.5 | " | 35 |
| 30.7 | " | 0.5 | " | 50 |
| 47.3 | " | 0.5 | Aerosil 300 40 | 25 |
| 47.3 | " | 0.5 | Coagulated Aerosil 100 | 25 |
| 47.3 | " | 0.5 | Silica particles 1000 | 25 |
| 62.0 | " | 0.5 | Aerosil 300 (8) | 3 |
| 27.3 | 41 | 0.5 | " | 55 |
| 48.6 | " | 0.5 | " | 25 |
| 48.3 | " | 0.5 | " | 25 |
| 40.8 | " | 0.5 | " | 25 |
| 46.7 | " | 0.5 | " | 25 |
| 45.3 | " | 0.5 | " | 25 |
| 42.0 | " | 0.5 | " | 25 |
| 48.7 | " | 0.5 | " | 25 |
| 38.7 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 48.7 | " | 0.5 | " | 25 |
| 47.3 | " | 0.5 | " | 25 |
| 47.3 | " | 0.5 | " | 25 |
| 48.6 | " | 0.5 | " | 25 |
| 48.0 | " | 0.5 | " | 25 |
| 45.3 | " | 0.5 | " | 25 |
| 38.7 | " | 0.5 | " | 20 |
| 47.3 | " | 0.5 | " | 25 |
| 47.3 | " | 0.5 | " | 25 |
| 47.3 | " | 0.5 | " | 25 |
| 47.3 | " | 0.5 | " | 25 |
| 48.7 | " | 0.5 | " | 10 |

| | | Organic solvent type coating film | | | | | |
|---|---|---|---|---|---|---|---|
| | | (d) Cationic electrodeposition improving pigment *6 | | Incorporation proportion (%) | Lubri-*7 cant incorporation proportion (%) | (e) Organic *8 solvent | | Film*9 thickness (μm) |
| | No. | Particle size (μm) | Type | | | Type | Incorporation proportion (%) | |
| Example | 1 | 0.2 | Hansa Yellow-G | 2 | 2 | Cyclohexanone | 55.2 | 1 |
| " | 2 | " | Hansa Yellow-G | 2 | 2 | " | " | " |
| " | 3 | " | Hansa Yellow-G | 2 | 2 | " | " | " |

TABLE 1-continued

| | | | | | | | | |
|---|---|---|---|---|---|---|---|---|
| " | 4 | " | Hansa Yellow-G | 2 | 2 | " | " | " |
| " | 5 | " | Hansa Yellow-G | 2 | 2 | " | " | " |
| " | 6 | " | Hansa Yellow-G | 2 | 2 | " | " | " |
| " | 7 | " | Hansa Yellow-G | 2 | 2 | " | " | " |
| " | 8 | " | Hansa Yellow-G | 2 | 2 | " | " | " |
| " | 9 | " | Hansa Yellow-G | 2 | 2 | " | " | " |
| " | 10 | " | Hansa Yellow-G | 2 | 2 | " | " | " |
| " | 11 | 0.2 | Hansa Yellow-G | 2 | 2 | Cyclohexanone | 55.2 | 1 |
| " | 12 | " | Hansa Yellow-G | 2 | 2 | " | " | " |
| Comparative Example | 13 | " | Hansa Yellow-G | 2 | 2 | " | " | " |
| Comparative | 14 | " | Hansa Yellow-G | 2 | 2 | " | " | " |
| Comparative | 15 | " | Hansa Yellow-G | 2 | 2 | " | " | " |
| Example | 16 | " | Hansa Yellow-G | 2 | 2 | " | " | " |
| " | 17 | " | Hansa Yellow-G | 2 | 2 | " | " | " |
| Comparative Example | 18 | " | Hansa Yellow-G | 2 | 2 | " | " | " |
| Comparative | 19 | " | Hansa Yellow-G | 2 | 0 | Water | 80 | " |
| Example | 20 | " | Hansa Yellow-G | 2 | 2 | Cyclohexanone | 49.7 | " |
| " | 21 | " | Hansa Yellow-G | 2 | 2 | " | 52.9 | " |
| " | 22 | " | Hansa Yellow-G | 2 | 2 | " | 59.1 | " |
| " | 23 | " | Hansa Yellow-G | 2 | 2 | " | 60.1 | " |
| Example | 24 | 0.2 | Hansa Yellow-G | 2 | 2 | " | " | |
| " | 25 | " | Hansa Yellow-G | 2 | 2 | " | " | " |
| " | 26 | " | Hansa Yellow-G | 2 | 2 | " | 54.2 | " |
| Comparative Example | 27 | " | Hansa Yellow-G | 2 | 2 | " | 47.7 | " |
| Comparative Example | 28 | " | Hansa Yellow-G | 2 | 2 | " | 50.2 | " |
| Example | 29 | " | Hansa Yellow-G | 2 | 2 | " | 50.5 | " |
| " | 30 | " | Hansa Yellow-G | 2 | 2 | " | 53 | " |
| " | 31 | " | Hansa Yellow-G | 2 | 2 | " | 52.5 | " |
| " | 32 | " | Hansa Yellow-G | 2 | 2 | " | 57.5 | " |
| " | 33 | " | Hansa Yellow-G | 2 | 2 | " | 59.8 | " |
| " | 34 | " | Hansa Yellow-G | 2 | 2 | " | 55.2 | " |
| " | 35 | " | Hansa Yellow-G | 2 | 2 | " | " | " |
| Comparative Example | 36 | " | Hansa Yellow-G | 2 | 2 | " | " | " |
| Comparative Example | 37 | 0.2 | Hansa Yellow-G | 2 | 2 | " | 49.3 | " |
| Comparative | 38 | " | Hansa Yellow-G | 2 | 2 | " | 63.3 | " |
| Example | 39 | " | Hansa Yellow-G | 2 | 0.1 | " | 55.2 | " |
| " | 40 | " | Hansa Yellow-G | 2 | 0.5 | " | " | " |
| " | 41 | " | Hansa Yellow-G | 2 | 1 | " | " | " |

TABLE 1-continued

| | No. | | Pigment | | | Solvent | | |
|---|---|---|---|---|---|---|---|---|
| " | 42 | " | Hansa Yellow-G | 2 | 3 | " | " | " |
| " | 43 | " | Hansa Yellow-G | 2 | 5 | " | " | " |
| " | 44 | " | Hansa Yellow-G | 2 | 10 | " | " | " |
| Comparative Example | 45 | " | Hansa Yellow-G | 2 | 0 | " | " | " |
| Comparative Example | 46 | " | Hansa Yellow-G | 2 | 15 | " | " | " |
| Example | 47 | " | Hansa Yellow-G | 2 | 2 | Acetone 1, Isophorone 1 | " | " |
| Comparative Example | 48 | 0.2 | Hansa Yellow-G | 2 | 2 | Ethyleneglycol monoethylether acetate | " | " |
| Comparative Example | 49 | " | " | 2 | 2 | Benzylalcohol | " | " |
| Example | 50 | " | " | 2 | 2 | Cyclohexanone | " | 0.2 |
| " | 51 | " | " | 2 | 2 | " | " | 0.5 |
| " | 52 | " | " | 2 | 2 | " | " | 0.8 |
| " | 53 | " | " | 2 | 2 | " | " | 1.1 |
| " | 54 | " | " | 2 | 2 | " | " | 1.4 |
| " | 55 | " | " | 2 | 2 | " | " | 1.7 |
| " | 56 | " | " | 2 | 2 | " | " | 2 |
| Comparative Example | 57 | " | " | 2 | 2 | " | " | 0.1 |
| Comparative example | 58 | " | " | 2 | 2 | " | " | 3 |
| Example | 59 | " | " | 2 | 2 | " | " | 1 |
| Example | 60 | 0.2 | Hansa | 2 | 2 | " | " | 1 |
| " | 61 | " | " | 2 | 2 | " | " | " |
| " | 62 | " | " | 2 | 2 | " | " | " |
| " | 63 | " | " | 2 | 2 | " | " | " |
| " | 64 | " | " | 2 | 2 | " | " | " |
| " | 65 | " | " | 2 | 2 | " | " | " |
| " | 66 | " | " | 2 | 2 | " | " | " |
| " | 67 | " | " | 2 | 2 | " | " | " |
| " | 68 | " | " | 2 | 2 | " | " | " |
| " | 69 | " | " | 2 | 2 | " | " | " |
| " | 70 | " | " | 2 | 2 | " | " | " |
| " | 71 | " | " | 2 | 2 | " | " | " |
| " | 72 | " | " | 2 | 2 | " | " | " |
| " | 73 | " | " | 2 | 2 | " | " | " |
| " | 74 | " | " | 2 | 2 | " | " | " |
| Example | 75 | 0.2 | Hansa Yellow-G | 2 | 2 | " | " | 1 |
| " | 76 | " | Insoluble | 2 | 2 | " | " | " |
| " | 77 | 0.05 | " | 2 | 2 | " | " | " |
| " | 78 | 0.5 | " | 2 | 2 | " | " | " |
| " | 79 | 2 | " | 2 | 2 | " | " | 2 |
| Comparative Example | 80 | — | — | 0 | 2 | " | " | 1 |
| Comparative Example | 81 | 3 | Insoluble | 2 | 2 | " | " | 2 |
| Comparative Example | 82 | 5 | " | 2 | 2 | " | " | 2 |
| Example | 83 | 0.2 | " | 0.1 | 2 | " | " | 1 |
| " | 84 | " | " | 1 | 2 | " | " | " |
| " | 85 | " | " | 5 | 2 | " | " | " |
| Comparative Example | 86 | " | " | 20 | 2 | " | " | " |
| Example | 87 | 0.2 | Phthalocyanine | 2 | 2 | " | " | " |
| " | 88 | " | Azo lake type | 2 | 2 | " | " | " |
| Comparative Example | 89 | " | Dye lake type | 2 | 2 | " | " | " |
| Example | 90 | " | Insoluble azo.carbon- | 2 | 2 | " | " | " |

TABLE 1-continued

| | | | | | | | | |
|---|---|---|---|---|---|---|---|---|
| Comparative Example | 91 | " | black (1:1) Insoluble azo (in a ratio to silica of 1:1.5) | 15 | 2 | " | " | " |

Performance *10

| Press process-ability | Spot weld-ability | Susceptibility to Electro-deposition | | Resist-ance to corro-sion | Film adhe-sion | Chro-mium elu-tion | Pig-ment elu-tion | Pig-ment bleed-ing |
|---|---|---|---|---|---|---|---|---|
| | | Coating appear-ance | Adhe-sion | | | | | |
| ◉ | ◉ | ◉ | ◉ | ◉ | ◉ | ◉ | ◉ | ◉ |
| " | " | " | " | " | " | " | " | " |
| " | " | " | " | " | " | " | " | " |
| " | " | " | " | " | " | " | " | " |
| " | " | " | " | " | " | " | " | " |
| " | " | " | " | " | " | " | " | " |
| " | " | " | " | " | " | " | " | " |
| ◉ | ◉ | ◉ | ◉ | ◉ | ◉ | ◉ | ◉ | ◉ |
| " | " | " | " | " | " | " | " | " |
| " | " | Δ | Δ | ○ | Δ | X | " | " |
| ○ | " | ◉ | ○ | X~Δ | Δ | ◉ | " | " |
| Δ~○ | Δ | ○ | Δ~○ | ○~◉ | Δ~○ | ○~◉ | " | " |
| ◉ | ◉ | ◉ | ◉ | ◉ | ◉ | ◉ | " | " |
| " | " | " | " | " | " | " | " | " |
| " | " | " | ○ | X | " | " | " | " |
| X | " | " | X | X | " | " | " | " |
| ◉ | " | " | ◉ | ◉ | " | " | " | " |
| " | " | " | " | " | " | " | " | " |
| " | " | " | " | " | " | " | " | " |
| ◉ | ◉ | ◉ | ◉ | ◉ | ◉ | ◉ | ◉ | ◉ |
| " | " | " | " | " | " | " | " | " |
| ○ | " | " | ○~◉ | ○ | ○ | " | " | " |
| " | " | " | ○ | " | " | " | " | " |
| ◉ | " | " | ◉ | ◉ | ◉ | " | " | " |
| " | " | " | " | " | " | " | " | " |
| " | " | " | " | " | " | " | " | " |
| " | " | " | " | " | " | " | " | " |
| X | Δ~○ | ○ | ○ | X | Δ~○ | " | " | " |
| ◉ | ○ | ○ | ◉ | X | ◉ | ◉ | ◉ | ◉ |
| X | X~Δ | ○ | Δ | ○ | X | " | " | " |
| ◉ | ◉ | ◉ | ◉ | ◉ | ◉ | " | " | " |
| " | " | " | " | " | " | " | " | " |
| " | " | " | " | " | " | " | " | " |
| " | " | " | " | " | " | " | " | " |
| ○ | " | Δ~○ | " | Δ~○ | " | " | " | " |
| ◉ | " | ◉ | " | Δ | " | " | " | " |
| " | " | " | " | ◉ | " | " | " | " |
| | | | Too high viscosity to coat | | | | | |
| X | ○ | X | X | Δ | X | ◉ | ◉ | ◉ |
| ◉ | ◉ | ◉ | ◉ | ◉ | ◉ | " | " | " |
| " | " | " | " | " | " | " | " | " |
| " | " | " | " | " | " | " | " | " |
| " | " | " | " | " | " | " | " | " |
| " | " | " | " | " | " | " | " | " |
| " | " | " | " | " | " | " | " | " |
| ○~◉ | " | " | " | Δ | " | " | " | " |
| ◉ | X | X~○ | " | ◉ | " | " | " | " |
| " | ◉ | ◉ | " | " | " | " | " | " |
| ◉ | ◉ | ◉ | ◉ | ◉ | ◉ | ◉ | ◉ | ◉ |
| " | " | " | " | " | " | " | " | " |
| " | " | " | " | " | " | " | " | " |
| " | " | " | " | " | " | " | " | " |
| " | " | " | " | " | " | " | " | " |
| " | " | " | " | " | " | " | " | " |
| " | " | " | " | " | " | " | " | " |

TABLE 1-continued

| | | | | | | | | |
|---|---|---|---|---|---|---|---|---|
| " | " | " | " | " | " | " | " | " |
| " | " | " | " | " | " | " | " | " |
| " | " | " | " | " | " | " | " | " |
| " | " | " | " | " | " | " | " | " |
| ⊚ | ⊚ | ⊚ | ⊚ | ⊚ | ○ | ⊚ | ⊚ | ⊚ |
| " | " | " | " | " | " | " | " | " |
| " | " | " | " | " | " | " | " | " |
| " | " | " | " | " | " | " | " | " |
| " | " | △ | ○ | " | " | " | " | " |
| △ | △ | ⊚ | " | △ | ○ | " | " | " |
| × | " | " | " | " | " | " | " | " |
| ⊚ | ⊚ | " | ⊚ | ⊚ | ⊚ | " | " | " |
| " | " | " | " | " | " | " | " | " |
| " | " | " | " | " | " | " | " | " |
| × | × | ○ | △ | × | △ | " | △ | ○ |
| ⊚ | ⊚ | ⊚ | ⊚ | ⊚ | ⊚ | ⊚ | ⊚ | ⊚ |
| " | " | " | " | " | " | " | △ | △ |
| " | " | " | " | " | " | " | ⊚ | ⊚ |
| " | " | " | ○ | △ | ○ | " | " | " |

The procedures for testing and evaluating and the reagents used in Examples and Comparative Examples as shown in Table 1 were as follows:

Notes:

*1  Measurement of a deposition amount was in accordance with HIS-0401.

*2  An amount of water soluble components is indicated by a proportion of a difference in chromium deposition amount between after and before immersing in boiling distilled water for 30 minutes devided by the initial chromium deposition amount. Measurement was made with fluorescence X-ray analysis.

*3  The types and molecular weights of major resins (Incorporation amounts are indicated in terms of % by weight).

Epicoat 1001 (Shell Chemical), Molecular weight, 900 (bisphenol type epoxy resin).

Epicoat 1007 (Shell Chemical), Molecular weight, 2,900 (bisphenol type epoxy resin).

Epicoat 1009 (Shell Chemical), Molecular weight, 3,750 (bisphenol type epoxy resin).

Byron 200 (Toyo Boseki), Molecular weight, 15,000 (oil free polyester resin).

Carboxylated polyethylene resin, Carboxyl groups, 12 mol %, 20% aqueous solution.

*4   Curing agents (Incorporation ratio is indicated in a ratio of curing agent/major resin) (Trimer type).

HMDI ..... hexamethylene diisocyanate.

HMDI-AEA ... HMDI blocked with ethyl acetoacetate.

HMDI-AEA ... HMDI blocked with ε-caprolactam.

(For Comparative Examples)

Superbeckamine J-820-60 (Dainippon Ink Chemical), Melamine resin, 60%.

Phenolic resin

BKS-316 (Showa Kobunshi) ... resol type phenolic resin

*5   Fumed silica (Incorporation proportion is indicated in terms of % by weight).

Aerosil 300 (Japan Aerosil), Average particle size, 8 nm.

Aerosil 0 x 50 (Japan Aerosil), Average particle size, 40 nm.

Showtex N-type (Nissan Chemical), 20% aqueous colloidal silica dispersion.

*6   Cationic electrodeposition improving pigments (Incorporation proportion is indicated in terms of % by weight).

As typical pigments, the following three for each type were used in Examples.

- Phthalocyanine type pigments

① Phthalocyanine blue, ② Phthalocyanine green, ③ Fast sky blue.

- Azo type pigments

④ Hansa Yellow G, ⑤ Permanent red 4R, ⑥ Hansa Yellow 3G.

- Azo lake type pigments

⑦ Lake red, ⑧ Brilliant Scarlet G, ⑨ Brilliant Carmine.

- Dye lake type pigments

⑩ Peacock Blue Lake, ⑪ Quinoline Yellow Lake, ⑫ Methyl Violet Lake.

*7      Polyethylene wax (Incorporation proportion is indicated in terms of % by weight).

Selidust 3620 (Hoext), Density, 0.95 to 0.97; Molecular weight, 2,000; Acid number, 0.

*8      Organic solvents [Incorporation proportion is indicated in terms of % by weight based on the total solvents (including those in varnishes and curing agents)].

*9      Deposition weight

Calculated from a difference in weight between initial uncoated steel sheet and dried coated one.

*10     Performance evaluation (1)   Press-processability

Cell-Tape peeling test on the surface of the sheet on the side as having been in contact with the die after the sheet was cylindrically drawn (without any lubricating oil).

⊚ no film separation.

○ slight galling (no film separation).

△ a little powdering.

× considerable powdering separation.

(2) Spot-weldability (Capability in numbers of weld)

Copper electrode having a tip diameter of 6 mm; Impact pressure, 200 Kgf; Electric current, 8 to 9 kA; Time, 10 cycle.

⊚ numbers of weld: 5,000 times or more.

○ numbers of weld: 4,000 times or more.

△ numbers of weld: 2,000 times or more.

× numbers of weld: less than 2,000 times.

(3) Susceptibility to Electrodeposition in an electrodepositing bath which has been used for some time.

The sheets after treatment with phosphate (PB3020, available from NIHON PARKERIZING) were subjected to the cationic electrodeposition in the bath (PT-U600, available from Nippon Paint) after it has been used at a temperature of 28°C for 60 days. 15 μm.

① Appearance (formation of pinholes due to gas evolution, craters)

⊚ no defect.

○ slight pinhole formation.

△ pinhole formation (locally).

× pinhole formation at the front surface.

② Adhesion (Tape peeling test with 100 checkers 1 mm in a side after immersing in a warm water at a temperature of 40°C for 10 days)

◎ no separation.

○ slightly separated.

Δ partially separated.

× considerably separated.

(4) Resistance to corrosion

Flat sheets (artificially cross-scratched), Salt spraying test (JIS Z-2371), 1,000 hours.

◎ 10% or less white rust.

○ 30% or less white rust.

Δ 5% or less red rust.

× more than 5% red rust.

(5) Adhesion of the coating film

Flat sheets, Secondary adhesion (Tape peeling test with 100 checkers 1 mm in a side after immersing in boiling water for 4 hours)

◎ no separation.

○ slightly separated.

Δ partially separated.

× considerably separated.

(6) Chromium elution

Evaluated from the total chromium quantity eluted into the degreasing liquor after degreasing the sheets in the degreasing liquor (L-4410, available from NIHON PARKERIZING) by spraying at a temperature of 60°C for 5 minutes at a rate of 20 g/ℓ.

⊚ 5 mg/m² or less.

○ 10 mg/m² or less.

△ 30 mg/m² or less.

× over 30 mg/m².

(7) Pigment elution

Evaluated from the appearance (the degree of decoloration) after degreasing the sheets in the degreasing liquor (L-4410, available from NIHON PARKERIZING) by spraying at a temperature of 60°C for 5 minutes at a rate of 20 g/ℓ.

⊚ no pigment elution.

○ slight pigment elution.

△ partial pigment elution.

× over-all pigment elution.

(8) Pigment bleeding

Evaluated for bleeding after baking the sheets having an overcoating (Rugerbake B531, available from Kansai Paint) of a thickness of 30 μm at a temperature of 140°C for 30 minutes.

⊚ no bleeding.

○ slight bleeding.

△ partial bleeding.

× over-all bleeding.

As discussed above, the organic composite plated steel sheets of the present invention which are highly susceptible to the cationic electrodeposition comprising a primer plated steel sheet of the prior art and a first layer of a specific less soluble chromate film formed on the prior plated steel sheet and a second layer formed of the first layer as a solid film with the coating composition are drastically improved in resistance to corrosion, press-processability, susceptibility to deposition, chromium elution-proofing property and spot-weldability. Moreover, the present organic composite plated steel sheets can avoid an deterioration of the sheets by allowing the baking of the coating films at lower temperatures. Therefore, they are epock-making organic composite plated steel sheets highly susceptible to the cationic electrodeposition which can fully satisfy the need on the side of users, i.e., which is improved in electrodeposition in the bath even after used for a longer period of time, as having been recognized as the largest problem. The organic composite plated steel sheets of the present invention which are highly susceptible to the cationic electrodeposition contain coloring pigments as cationic electrodeposition improving pigments so that they overcome also the problem that it is difficult for users to distinguish the inside from the outside at the time of press working and the like because the coating films of the prior organic composite plated steel sheets have been clear. The organic composite plated steel sheets of the present invention which are highly susceptible to the cationic electrodeposition allow to be used as simple colored steel sheets which can be simply repaired by coating scratches after processing with an electrodeposition paint containing the same color pigments depending upon the color. Thus, they are novel surface treated steel sheets which are disposable in new area of application.

What is claimed is:

1. An organic composite plated steel sheet highly susceptible to cationic electrodeposition comprising a steel substrate plated with one selected from a group consisting of zinc, a zinc alloy, a zinc composite alloy, or aluminum, and a first layer of a less soluble chromate film having a water soluble content of 5% or less formed on said substrate in an amount of 10 to 150 mg as the total amount of chromium per square meter, and a second layer as a solid thin coating film of 0.2 to 2 $\mu$m formed on said first layer, the second layer being formed with a coating composition containing 10 to 50% by weight of solids comprising:

(a) 30% by weight or more of a bisphenol A type epoxy resin having a number average molecular weight of 300 to 100,000 based on the total solids in said coating composition;
   (b) a weight ratio of at least one curing agent selected from the group consisting of polyisocyanate compounds and block polyisocyanate compounds to said epoxy resin solid of 0.1 to 2.0;
   (c) 5 to 50% by weight of fumed silica having an average particle size of 0.1 to 100 nm based on the total solids in said coating composition;
   (d) at least one pigment selected from the group consisting of insoluble azo type, azo lake type, and phthalocyanine type organic pigments having an average size of 0.01 to 2 $\mu$m in an amount of 0.1 to 15% by weight based on the total solids in said coating composition and in a weight ratio of said pigment to said fumed silica of 0.01 to 1.0; and
   (e) 40% or more of a ketone type organic solvent in said coating composition.

2. The organic composite plated steel sheet highly susceptible to cationic electrodeposition according to claim 1, wherein said ketone type organic solvent (e) in said coating composition is at least one member selected from the group consisting of methylisobutyl ketone, acetone, cyclohexanone, and isophorone.

3. The organic composite plated steel sheet highly susceptible to cationic electrodeposition according to claim 1, wherein said coating composition may contain a resol type phenolic resin in an amount of a weight ratio of the resin to the solids of said curing agent (b) of 0.1 to 1.0.

4. The organic composite plated steel sheet highly susceptible to cationic electrodeposition according to claim 1, wherein said coating composition may contain 0.1 to 10% by weight of polyethylene wax based on the total solids in said coating composition.

5. The organic composite plated steel sheet highly susceptible to cationic electrodeposition according to claim 1, wherein said pigment is selected from the group consisting of insoluble azo type pigments having the following general formula:

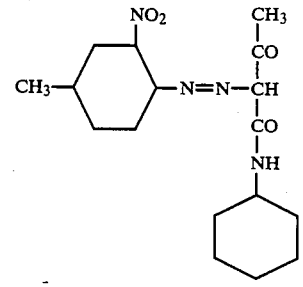

phthalocyanine type organic pigments, azo lake type organic pigments and a mixture thereof.

* * * * *